United States Patent
Harvey

[15] 3,712,139
[45] Jan. 23, 1973

[54] VOLUME MEASURING CONTAINER
[72] Inventor: John P. Harvey, Grand Haven, Mich.
[73] Assignee: Harvey Harvesters, Inc., Sprink Lake and Grand Haven, Mich.
[22] Filed: July 13, 1970
[21] Appl. No.: 54,421

[52] U.S. Cl....................73/428, 33/126.7 R, 220/71
[51] Int. Cl..............................................G01f 19/00
[58] Field of Search............33/126, 126.7 R; 141/94; 220/71; 73/426–428

[56] References Cited

UNITED STATES PATENTS

| | | | |
|---|---|---|---|
| 2,711,099 | 6/1955 | Hastings | 73/427 X |
| 2,829,437 | 4/1958 | Croft et al. | 33/126.7 R |
| 3,492,730 | 2/1970 | Tiberi | 33/126 |

FOREIGN PATENTS OR APPLICATIONS 241,502  1/1960  Australia.................220/71

Primary Examiner—Louis R. Prince
Assistant Examiner—Daniel M. Yasich
Attorney—Cullen, Settle, Sloman & Cantor

[57] ABSTRACT

A container which is adapted to be filled with fruit, particularly berries, cherries, grapes or the like smaller fruit, placed in the container immediately after harvesting and immersed in water to preserve their freshness; the container is provided with tension cables attached to opposite side walls of the container and crossing each other at the center of the container to reinforce the side walls of the container which are initially flexed to bulge outwardly before the cables are applied; the intersection of the tensioning cables provides an accurate center locating means for a probe adapted to be inserted into the container to measure the volume of the product retained in the container.

4 Claims, 3 Drawing Figures

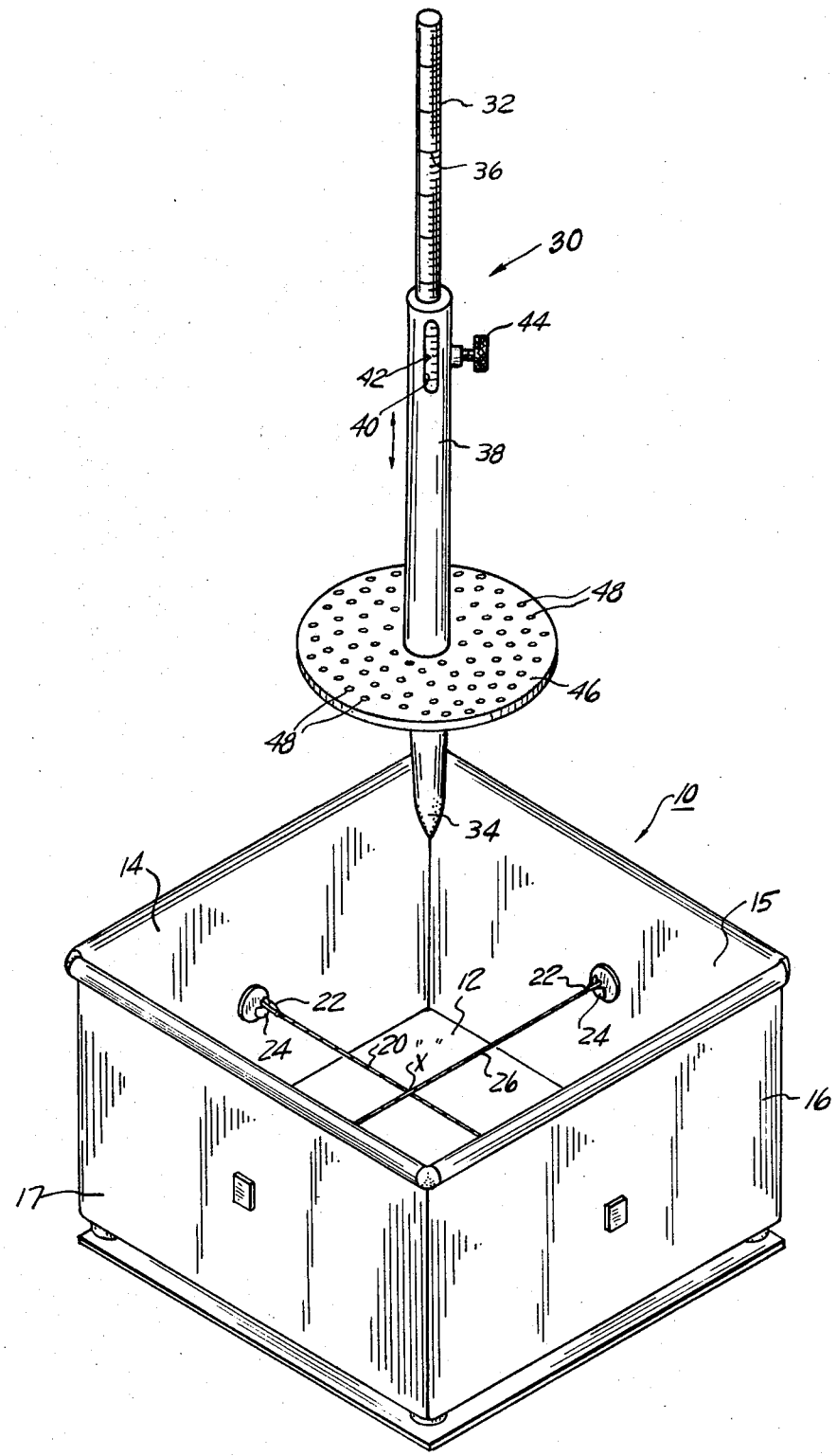
FIG. I
INVENTOR
JOHN P. HARVEY

INVENTOR
JOHN P. HARVEY

BY Cullen, Settle, Sloman & Cantor

ATTORNEYS

VOLUME MEASURING CONTAINER

BACKGROUND AND SUMMARY OF THE INVENTION

The present invention relates to containers for storage of bulk fruits, and more in particular to a measuring and storage container for various berry type fruits, such as cherries.

It has been known that in mechanical harvesting of fruits and particularly cherries, damage may be done to cherries which requires the immersion in cold water in the field immediately after harvesting to preserve the fruit.

Since, traditionally, cherries have been sold by dry weight, the immersion of the cherries in water in the field requires them to be sold by volume rather than by dry weight. For this reason, a measuring container is needed for the transaction between the grower and the processor to properly enable the cherries to be sold by volume rather than by weight.

Serious problems have been encountered in these type of containers used in the field for berry harvesting, since the static head of water in the container into which the berries are immersed, and which may have a depth of 2 feet, is very substantial, tending to cause the side walls of the container to be bulged outwardly. Since this container is adapted as a volume measuring device for the fruit which it contains, the outwardly bulging side walls of the container cause incorrect volume measurement. For example, if the area of the bottom of the container is designed to have a convenient known quantity such as for instance, 12 square feet or 1,728 square inches, every inch of depth of the container represents 1,728 cubic inches of volume, equal to 1 cubic foot. Thus, ordinarily, it is a simple method to determine the volume of the bulk of cherries or other similar goods in the container, by simply measuring the depth in inches.

However, in order for this volume measuring function to be accurate and reliable, it is necessary to know that the container has not become distorted from damage in use and that the side walls of the container have not bulged outwardly due to the head of water within the container.

Furthermore, volume measurement of the berries retained in the container is usually done by a depth probe which is inserted into the container. However, to obtain accurate volume measurement, the measurement must be done substantially at the center of the container since the container may not always be on level ground causing the liquid water and berry mass to be at a higher level at one side of the container than at the other, thus, measuring the depth at the accurate center of the container will give the average depth of the liquid water and berry mass to reflect the proper volume.

The present invention provides a container of this kind having internal stay means connecting opposite side walls of the container which cross at the center of the container. The stay means in the measuring container of the present invention are in effect tensioning cables which are completely inelastic to reinforce opposite side walls of the container which originally have been pre-stressed outwardly.

The tensioning cables for the container of the present invention have several functions:

First, they are intended to reinforce the side walls of the container to normally prevent them from bulging outwardly under load;

Second, they provide a convenient indicating means of the proper filling of the container to the desired volume, thus, if the cables indicate any slackness, it will mean the walls of the container have distorted inwardly through some outward force, and the contents of the container cannot be properly measured; conversely, the walls of the container can bulge outwardly only if the cables are ruptured, the presence of a broken cable also indicates that the container is no longer an accurate measuring device;

Third, the tensioning cables, in addition to connecting opposite side walls of the container of the present invention, provide a convenient center-locating means for the volume measuring depth probe to be inserted into the liquid mass in the container. The intersection of the tension cables at the center of the container, indicate the positive center location for placement of the depth measuring probe.

In most cases, in the filled condition of the container, the cables are submerged in the liquid mass of cherries and water. In the present instance, the depth measuring probe, which is merely a staff having an adjustable disc at the lower end, is inserted into the liquid mass of cherries and water and then shifted along in the container until the staff abuts both cables at the intersection of the cables, which is the exact center of the container. Thus, the tensioning cables provided in the container of the present invention provide a positive center locating means for the depth measuring probe.

Other particular objects and further advantages of the present improved measuring container will become evident or particularly be pointed out by the following detailed description in connection with the appended drawings illustrating a preferred embodiment of the invention.

BRIEF DESCRIPTION OF THE DRAWINGS

FIG. 1 is a perspective illustration of the present improved measuring container also showing a volume measuring probe in the process of being inserted into the container;

DESCRIPTION OF THE PREFERRED EMBODIMENT

Figure 3:
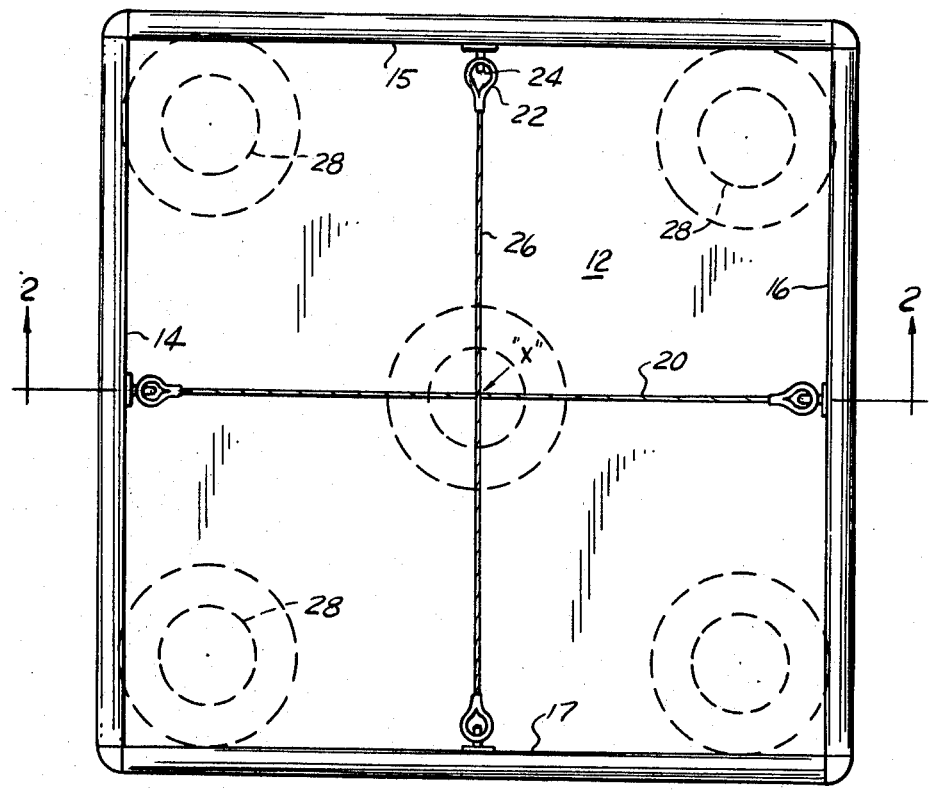
FIG. 3 is a likewise enlarged top plan view of the container shown in FIG. 1.
Figure 2:
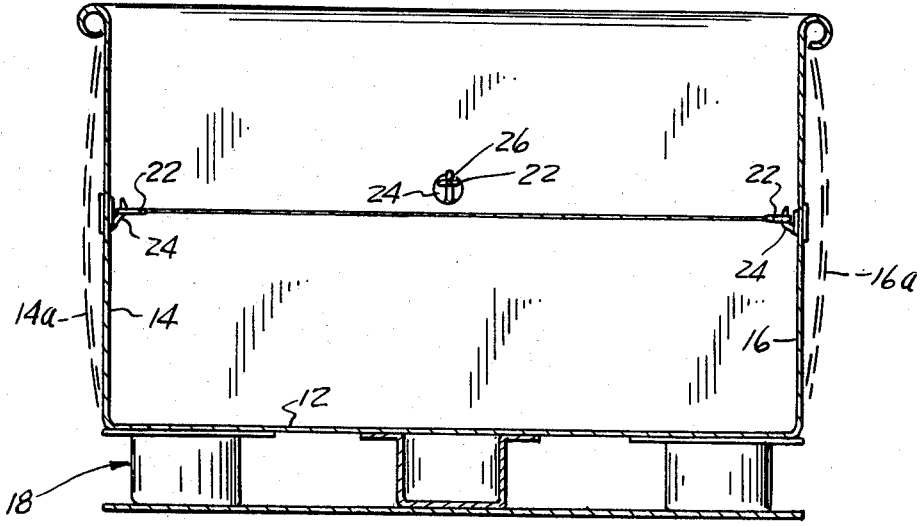
FIG. 2 is an enlarged longitudinal cross-section through the container shown in FIG. 1.

With continuing reference to the drawings, and particularly FIGS. 2 and 3, the present improved measuring container 10 is primarily composed of a bottom wall 12 and two pair of oppositely disposed longitudinal side walls 14, 15, 16 and 17, respectively. The container 10 is made of a fluid tight sheet material such as sheet metal or plastic. The container can either be press formed in one piece or can be of fluid tight welded or otherwise formed in more than one piece. Press forming in one piece further assures that the container will be fluid tight.

A plurality of spaced legs 18, may be attached to the underside of the bottom 12 for ground support of the container and to permit the handling of the container by means of fork lift trucks or the like for transfer of the container to a designated location.

The opposite side walls 14 and 16 are connected internally of the container by means of a tension member 20, which may be in the form of a wound wire cable provided with eyes 22 at its opposite ends for engagement over a pair of hooks 24, which are suitably secured to the opposite side walls 14 and 16 substantially at the center of the side walls.

The other pair of opposite longitudinal side walls 15 and 17 are similarly connected by another tension member 26 disposed slightly above the tension member 20.

It will be noted, particularly from FIG. 3, that the tension members 20 and 22 intersect at a point "X" which is the geometrical center of the container 10. The intersection point "X" of the tension members 20 and 22 serves a purpose to be explained later on in the description.

As indicated in FIG. 2 by the dot and dash line positions 14a and 16a, the side walls 14 and 16 are initially, that is, prior to the attachment of the tension cable 20, slightly bulged outwardly a predetermined amount. Thus, when the tension member 20, which is of a predetermined length and non-stretchable, is attached to the hooks 24, the opposite side walls will be drawn inwardly towards each other from the predeformed outwardly bulged position 14a and 16a to the vertical normal planar position 14 and 16 and thereby prestressing the tension member 20. The opposite side walls 15 and 17 are similarly predeformed to bulge outwardly prior to attachment of the tension member 22 so that this tension member will be likewise prestressed in assembly.

As explained in the preamble of this specification, the present improved measuring container 10 is adapted to receive relatively soft, perishable bulk goods, such as berry-type fruits, for instance, cherries, grapes or the like, which immediately after harvesting must be immersed in water to preserve their fresh condition. The container 10 is used for direct in-field measurement of the volume of its contents and therefore is designed to have a predetermined base area to obtain the required cubic foot of volume.

However, if the container would be damaged in use resulting in deformation of the side walls, the usefulness of the container as a volume measuring device is destroyed. The internally attached tension members 20 and 22, therefore, provide a quick visual means of determining whether the container has maintained its original shape and intended volume capacity. Therefore, if the tension members 20 and 22 show a slackening, it would indicate that the side walls have been deformed inwardly, which condition must be corrected prior to using the container as a volume measurement. Similarly, if damage or over-load of the container causes the side walls to bulge outwardly, the tension members 20 and 22 will be over-stressed and eventually will fail, thus, indicating likewise that the container, in that condition, is not useful for correct volume measurement of its contents.

With reference now to FIG. 1, correct volume measurement of the fluidic water and fruit contents of the container 10 is usually obtained by insertion of a depth probe generally indicated at 30.

The depth probe 30 herein shown is of conventional design and is comprised mainly of a longitudinal rod 32 having a pointed lower end 34. Indicia means 36 are provided longitudinally along the rod 32 to provide a scale and the rod 32 receives a longitudinally adjustable slide member 38 which, at its upper end, has a window 40 provided with a point 42 to visually indicate the proper position or adjusted high position of the slide 38 on the rod 32 by reading off the position on the scale 36. The slide member 38 can be secured in an adjusted position on the rod 32 by means of a lock screw 44. The lower end of the slide member 38 supports a plate 46 which is provided with a plurality of apertures 48 to reduce the weight of the plate and to reduce the fluid displacement force when the probe 30 is inserted into the fluidic mass in the container 10. The slide member 38 is adapted to easily slide up and down on the rod 32 when the lock screw 44 is released.

In practice, the probe 30 is inserted in the container 10 filled with a fluidic mass of water and fruit causing the plate 46 to abut upon the top of the bulk of the fruit and, by moving the probe 30 back and forth in the container 10, the plate 46 spreads the fruit throughout the container to an even level. The respective height of the bulk of fruit in the container 10 can then be read off from the scale 36 on the rod 32 by the upwardly adjusted position of the slide member 38, the plate 46 resting on top of the bulk of the fruit.

Since the present improved measuring container 10 is intended primarily for use in the field, it is not always possible to maintain the container in a level position relative to the ground, causing shifting of the contents to one side or the other. Consequently, to obtain an accurate volume measurement, the measurement will have to be taken at the geometrical center of the container, or as near to it as possible. In the present invention, the internal tension members 20 and 22 provide a convenient guide means for the depth probe 30 to enable a person to guide the depth probe along the cables until it meets the intersection of the tension members at the point "X", which is substantially the center of the container and at which the volume measurement should be taken.

The particular volume measurement depth probe 30 may be constructed differently from that shown in FIG. 1 and forms no part of the present invention.

It will be evident from the foregoing description and attached drawings, that an improved volume measuring container has been provided, particularly for in-field use for berry harvesting, which is provided with prestressed internal tensioning means to maintain the container in its accurate volumetric shape.

The internal tensioning means of the present improved measuring container, at the same time provide a visual indication that the container volume is as intended and that the walls of the container have not been distorted.

Furthermore, the tensioning means of the present improved container provide a positive means to locate the geometrical center of the container for the insertion of a volume measuring depth probe, to obtain the correct average reading of the volume of the contents in the container.

Although the present invention has been described in connection with a preferred embodiment thereof, it will be obvious that various modifications in structure and shape may be made without departing from the spirit and essential characteristic of the invention as indicated by the scope of the appended claims

I claim:

1. A measuring container for temporary storage of freshly harvested berry type fruit, said fruit being immersed in water in said container, said container comprising a bottom, a first pair of opposite longitudinal side walls connected to said bottom, a second pair of opposite longitudinal side walls between the ends of said first pair of side walls and connected thereto and to the bottom, all of said side walls being initially deformed to bulge outwardly from a vertical plane a predetermined distance, a first inelastic flexible tension cable connected between said first pair of side walls substantially at the center of said walls, a second inelastic flexible tension cable connected between said second pair of side walls substantially at the center of said walls and crossing said first tension cable at the geometrical center of said container, to guide a depth probe or the like to the center of the container, said first and second tension cable each being of a length corresponding to the designed width and length of said container to thereby draw each of said initially outwardly bulged side walls inwardly into planar position and prestressing said cables, said cables designed to rupture upon overloading of said container or other damage causing the walls to bulge outwardly.

2. In the measuring container as defined in claim 1, said cables providing an indicating means for the condition of said container.

3. A measuring container of self-indicating volumetric accuracy comprising bottom and side walls made of fluid impervious material, and a plurality of inelastic tension members interconnecting said side walls and intersecting internally of said container to maintain said side walls respectively in planes perpendicular to said bottom; said side walls each initially being deformed outwardly to a non-planar configuration and said tension members being pre-stressed upon attachment thereto to retain the walls in said planes; said container being adapted to receive a mass of flowable material; said tension member when slack indicating inward deformation of said side walls and when ruptured indicating outward deformation of said side walls, so that a mere visual inspection of said tension members in a taut, non-ruptured condition indicates the volumetric accuracy of said container.

4. In the measuring container as defined in claim 3, the improvement wherein the intersection of said tension members coincides with the geometric center of said container to provide a guide for a depth probe used for measuring the volume of the mass in said container.

* * * * *